June 5, 1934. G. J. MEUER Re. 19,200

ROTARY SNAP SWITCH

Original Filed Nov. 10, 1930 2 Sheets-Sheet 1

Inventor
George J. Meuer
By Frank H. Hubbard
Attorney

June 5, 1934. G. J. MEUER Re. 19,200
ROTARY SNAP SWITCH
Original Filed Nov. 10, 1930 2 Sheets-Sheet 2
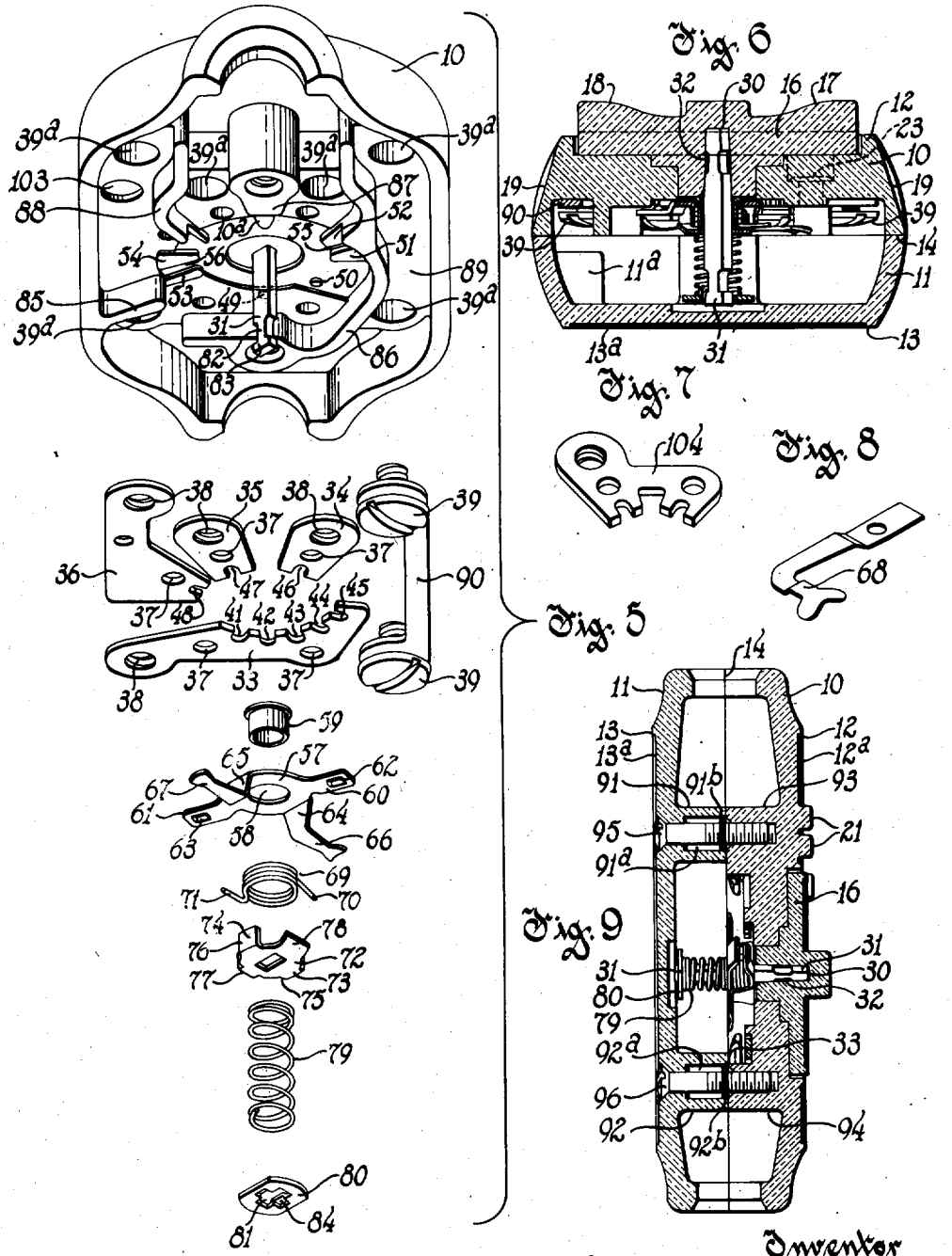
Inventor
George J. Meuer
By Frank H. Hubbard
Attorney Reissued June 5, 1934

Re. 19,200

UNITED STATES PATENT OFFICE 19,200

ROTARY SNAP SWITCH

George J. Meuer, Milwaukee, Wis., assignor to Cutler-Hammer, Inc., Milwaukee, Wis., a corporation of Delaware Original No. 1,921,765, dated August 8, 1933, Serial No. 494,633, November 10, 1930. Application for reissue April 9, 1934, Serial No. 719,814

15 Claims. (Cl. 200—65)

This invention relates to improvements in rotary snap switches, and although not limited thereto the invention relates more particularly to rotary snap switches of the feed-through type for multiple circuit control.

An object of the invention is to provide a simple and reliable rotary snap switch mechanism for multiple circuit control.

Another object is to provide a switch mechanism of the aforementioned character having a minimum number of parts which may be readily and inexpensively assembled.

Another object is to provide a novel form of enclosing casing for the switch mechanism, together with novel actuating means for the latter.

Another object is to provide novel means integral with the switch casing and the actuating element for indicating both visually and to the touch the respective operative positions of the switch mechanism.

Another and more specific object is to provide a rotary snap switch mechanism of the feed-through type for multiple circuit control, in which the switch parts may be moved in a step-by-step manner in either direction from any rotary position thereof.

Another object is to provide stationary and movable switch contacts of novel form.

Another object is to provide a rotary snap switch mechanism having interchangeable stationary contacts to provide for different types of circuit control.

Other objects and advantages of the invention will hereinafter appear.

The accompanying drawings illustrate certain embodiments of the invention which will now be described, it being understood that the invention is susceptible of embodiment in other forms without departing from the scope of the appended claims.

In the drawings, Figure 1 is a top plan view of a feed-through rotary snap switch constructed in accordance with my invention.

Fig. 5 is an exploded perspective view of the casing section and switch parts illustrated in Fig. 3.

Fig. 6 is an enlarged sectional view, on the line 6—6 of Fig. 1.

Fig. 7 is a detail perspective view of the double-contact element used in the device illustrated in Fig. 4.

Fig. 8 is a detail perspective view of the auxiliary spring contact element used in the device illustrated in Fig. 4, and Fig. 9 is an enlarged sectional view, on the line 9—9 of Fig. 1.

Figure 1:
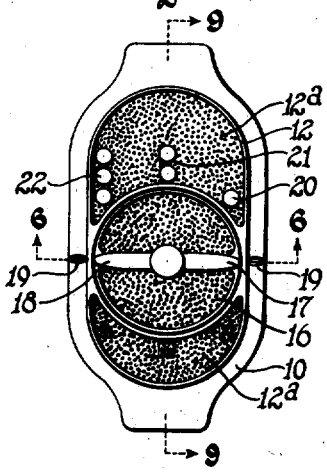

Referring to the drawings, the numerals 10 and 11, respectively, designate the upper and lower sections of the longitudinally divided two-part insulating casing of the switch. Said casing sections may be molded from any suitable insulating material, but I prefer to employ a material of the phenol-formaldehyde condensation type, such as that sold under the trade-named of "Bakelite." Said casing sections are provided with flat outer surfaces 12 and 13 which are parallel with the line of division 14 between the same. The major portions of said surfaces 12 and 13 are preferably slightly depressed or countersunk and stippled or otherwise ornamented, as indicated at 12ª and 13ª, to provide an attractive paneling effect.

Adapted to seat within a cylindrical recess 15 in the surface 12 of section 10, and approximately flush with said surface, is an actuating disk 16, which is preferably molded from insulating material like that employed in forming the casing sections. Extending diametrically across the disk 16 are a pair of finger lugs or projections 17 and 18 formed integrally therewith and adapted to provide for manipulation of said disk as an actuator for the switch mechanism.

The arrangement is such that when the lugs 17, 18 are in the rotary relation illustrated in Fig. 1 the switch will be in "off" position, and the opposite sides of casing section 10 are notched or grooved, as shown at 19, for cooperation with lugs 17, 18 to indicate, both visually and to the touch, such positioning of the switch mechanism. The lower portion of the surface 12ª is likewise provided with legends, such as the raised letters "L", "M" and "H" to indicate, respectively, such positioning of the switch mechanism as to provide for "low", "medium" or "high" heating effect of the resistance elements controlled thereby.

The upper portion of surface 12[a] is likewise provided with elements such as the single, double and triple bosses or projections 20, 21 and 22 to indicate to the touch a positioning of the switch such as to provide a low, medium or high heat when either of the lugs 17 or 18 is alined therewith respectively.

Figure 2:
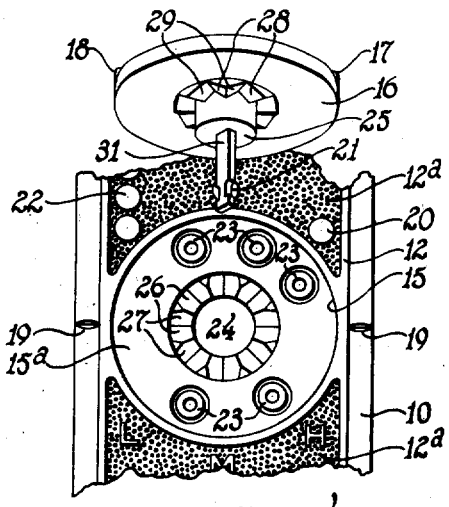
Fig. 2 is an enlarged fragmentary view similar to Fig. 1, but with the actuating disk and spindle separated from the switch casing for purposes of illustration.

Arranged around the bottom surface 15[a] of recess 15 (Fig. 2) are a plurality of openings to accommodate the shanks of eyelets 23 which secure the combined contact and terminal members to the inner surface of section 10, as hereinafter more fully described,—said openings having relatively deep countersunk portions (as best shown in dotted lines in Fig. 6) to accommodate the flanged ends of said eyelets 23. Extending through section 10 in concentric relation to recess 15 is a circular opening 24 within which the cylindrical portion 25 formed on disk 16 is adapted to bear. Surrounding the opening 24 and having the high points thereof located slightly below the surface 15[a] is a track consisting of sixteen cam surfaces inclined alternately in opposite directions (as indicated at 26, 27) to form eight teeth of like form and dimensions. Formed integrally with the disk 16 and surrounding the cylindrical portion 25 of the latter are a corresponding number of inclined cam surfaces 28, 29 forming eight teeth to normally mesh with those aforedescribed.

Centrally located within disk 16 and the portion 25 thereof is a recess 30 of substantially rectangular cross section, within which the upper end of a punched sheet metal spindle 31 is adapted to be secured, as by a drive fit,—a suitable cementing medium 32 being preferably employed to resist separation of said parts.

Figure 3:
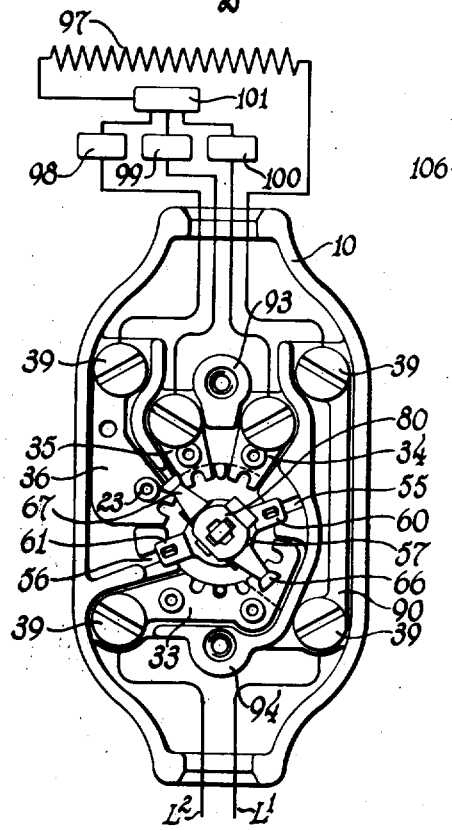
Fig. 3 is an interior plan view of the upper section of the longitudinally divided two-part switch casing, showing the switch mechanism and one arrangement of stationary contact and terminal members,—with a diagrammatic illustration of the circuits to be controlled thereby.
Figure 4:
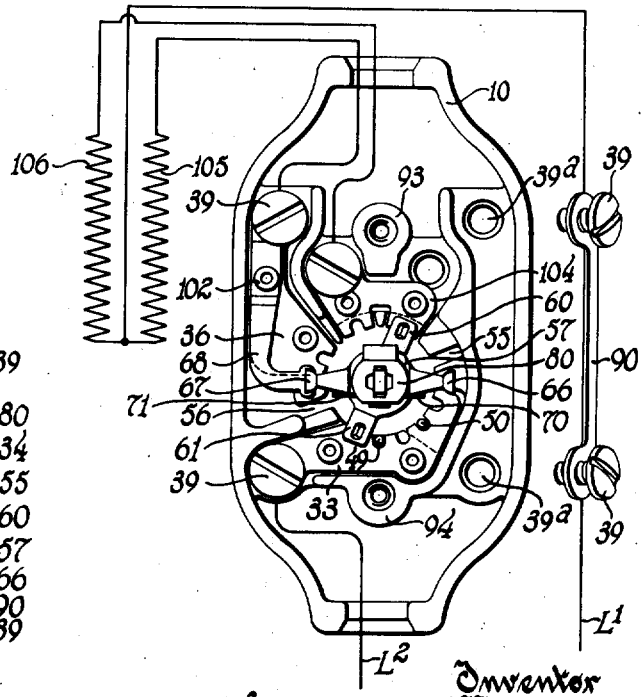
Fig. 4 is a view similar to Fig. 3, but showing a slightly different arrangement of stationary contact and terminal members,—with a diagrammatic illustration of a different arrangement of circuits to be controlled thereby.

The inner surface of section 10 of the casing is suitably recessed as shown in Figs. 3, 4 and 5 to accommodate the several combined contact and terminal members 33, 34, 35 and 36 of the switch,—each of said members preferably consisting of a flat sheet metal punching. Said members are provided with openings 37 to receive the shanks of eyelets 23 which are then upset to rigidly secure the members in position. Rivets or other forms of securing elements may of course be substituted for the eyelets 23. Each of said members is also provided with a tapped opening 38 to accommodate the threaded shanks of binding screws 39 of usual form,—casing section 10 being provided with suitable recesses 39[a] to provide clearance for said screws. The contact portions of said members are formed by providing substantially U-shaped notches at the inner edges thereof, respectively,—the member 33 having five equally spaced notches 41, 42, 43, 44 and 45 and the members 34, 35 and 36 each having one notch 46, 47 and 48, respectively.

The inner surface of section 10 is provided with integral bosses or projections 49 and 50 which coincide with and substantially fill the notches 42 and 44 to provide an approximately level surface to be traversed by the bridging contactor during movement of the latter between notches 41 and 43 and between notches 43 and 45. A similar effect might be obtained by omitting the notches 42 and 44, but I prefer the arrangement illustrated, since it insures proper positioning of member 33 and further provides for disengagement of the contactor from member 33 during movement of the contactor between certain of its operative positions whereby a double break of each of the controlled circuits is insured.

Arranged substantially flush with the contact portions of member 33 at each end of the latter are pairs of insulating projections 51, 52 and 53, 54 between which respective pairs are notches or recesses 55, 56 which are diametrically opposed to each other. When the two lower arms of the bridging contactor engage the walls of notches 55, 56 (as shown in Fig. 3) the switch is in off position, and the actuating disk 16 will be in the rotary relation illustrated in Fig. 1. An insulating button or boss 10[a] is located between and substantially flush with the contact portions of members 34 and 35.

The bridging contactor of the switch preferably consists of a punched and stamped sheet metal member 57 having an opening 58 to receive the smaller cylindrical end portion of a shouldered bushing 59 which is loosely mounted upon the spindle 31. Member 57 is provided with a pair of diametrically opposed arms 60 and 61 which are slightly offset upwardly as shown. The contact portions of said arms are provided with bosses or projections having oppositely inclined or cam-shaped surfaces formed by depressing the material in the manner shown at 62 and 63 (Fig. 5). Arranged at an angle to the arms 60 and 61 are a pair of diametrically opposed upstanding lugs 64 and 65, from which as shown the auxiliary contact arms 66 and 67 project outwardly to a greater extent than and in a plane a considerable distance above the arms 60 and 61. The contact arms 66 and 67 are adapted to function only in conjunction with the auxiliary spring contact arms 68 (Figs. 4 and 8). Hence the arms 66 and 67 might be omitted from the switch shown in Figs. 3 and 5,—but it is preferred to employ a contactor which is standard for both forms of the switch mechanism.

Surrounding the bushing 59 is a coiled torsion spring 69, the angularly bent ends 70 and 71 of which are respectively adapted to engage the adjacent side edges of the lugs 64 and 65. Slidably mounted upon spindle 31 and interlocked therewith for rotation thereby is a metal member 72, said member having a pair of diametrically opposed parallel lugs 73 and 74, the adjacent side edges 75 and 76 of which lugs are likewise adapted to engage with the ends 70 and 71, respectively, of spring 69. The lower ends of lugs 73 and 74 are adapted to bear against the intermediate portion of member 57. A lug 77 is provided to insure proper positioning of spring 69, and a lug 78 is also provided to insure proper assembly of these parts,—each of the lugs 77 or 78 being arranged to positively initiate movement of the bridging contactor from each operative position thereof if for any reason the contactor tends to "stick".

Also surrounding spindle 31 and adapted to bear at one end against the member 72 is a coiled compression spring 79, said spring being compressed to a predetermined degree by the plate or washer 80. Washer 80 is provided with an opening 81 to accommodate the end of spindle 31, said spindle having a reduced neck portion 82 whereby the washer may be turned to permit seating of the end portion 83 of the spindle within the pocket 84 formed in said washer. As will be apparent, the spring 79 thus acts to retain all of the movable parts of the switch (including the actuating disk 16) in assembled relation to each other and to casing section 10.

Section 10 of the casing is provided with a plurality of integral vertical walls or barriers 85, 86, 87 and 88 to properly separate the wiring portions of the switch from each other,—the wall 86 providing a passage 89 between the same and one side wall of section 10 to accommodate the bus member 90 which provides a through connection independently of the switch mechanism. Member 90 is provided at its opposite ends with tapped openings to receive the binding screws, and additional recesses 39[a] are provided in section 10 to provide clearance for said screws.

It will be noted that the switch contactor is movable in either direction to any one of eight mechanically distinct positions or four electrically distinct positions, and that the contactor is movable in either direction in a step-by-step manner from any one of its operative positions, such movement being effected with a snap action. Thus, assuming a given positioning of the bridging contactor, it will be obvious that upon rotation of the disk 16 and its spindle 31 the torsion spring 69 will be stressed, thus tending to effect movement of the contactor. Such movement will be resisted due to the form of the contact portions 62, 63 of the contactor and the notches formed in the contact portions of the stationary contact members and/or the notches 55, 56 formed in section 10,—which resistance to movement is accentuated by the normal degree of compression of spring 79.

Moreover, due to the provision of the cooperating cam teeth 26, 27 and 28, 29 formed upon section 10 and disk 16, such turning of the disk will result in such movement of the disk and spindle relative to section 10 as to increase the degree of compression of spring 79. The bridging contactor is therefore restrained from movement pending storage of a predetermined amount of energy within spring 69. At the same time the cam teeth upon section 10 and disk 16 act to reduce the degree of compression of spring 79 to normal with resultant snap movement of the contactor to its next succeeding position under the bias of spring 69. The cam teeth upon section 10 and disk 16 also act to more or less positively hold the disk in each of the several positions to which it may be moved.

The lower section 11 of the casing is preferably hollow, except for the provision of a pair of hollow posts or abutments 91 and 92 which are adapted to aline with similar recessed posts 93 and 94 formed integrally with section 10. The recesses in posts 93 and 94 are tapped to receive the shanks of screws 95 and 96 whereby the casing parts are secured to each other. The posts 91 and 92 are preferably provided with countersunk recesses 91[a], 92[a] to accommodate the relatively small washers 91[b], 92[b] of fiber or similar material which are threaded upon screws 95 and 96 to retain the latter against complete displacement from section 11. Section 11 is also preferably provided with a pair of relatively narrow ribs or projections (one of which is shown at 11[a] in Fig. 6) which are alined with the screws 39 of bus member 90 to insure retention of the latter within the passage 89.

In Fig. 3 I have illustrated one arrangement of circuits adapted for control by the mechanism aforedescribed. Thus the numeral 97 designates the single resistance element of a known form of heating pad, or the like; and the numerals 98, 99 and 100 designate suitable electrothermally responsive elements, such as bimetallic strips, which are respectively calibrated or adjusted to automatically control the flow of current through the resistance 97 to provide for selection of the degree of heat to be given off by the latter. For instance, it may be assumed that element 98 when rendered active will provide for control of resistance 97 for a low value of heat emission by the latter; whereas element 99 when active will provide for a heating effect of medium value, and element 100 when active will provide for a heating effect of high value, only one of the elements 98, 99 or 100 being effective at any given time. Element 101 may represent a master or safety thermostat, which is adapted to act to prevent excessive heating by resistance 97 in the event of failure of any one of the elements 98, 99 or 100.

The circuit may be readily traced as follows: Assuming movement of the bridging contactor in a clockwise direction from the off position illustrated (by counterclockwise movement of disk 16) to a position wherein it bridges members 33 and 36, the circuit will extend from line $L^1$ through bus member 90 and resistance 97, thence through thermostatic elements 101 and 98 to member 36, through arms 61 and 60 of the bridging contactor to element 33 and line $L^2$, thus providing for low heat control of resistance 97. Upon movement of the bridging contactor in the same direction to its next operative position, element 98 will be disconnected, and element 99 will be connected in a circuit which includes the members 35 and 33, thus providing for medium heat control of resistance 97. Similarly upon movement of the contactor in the same direction to its next operative position element 100 will be rendered active through a circuit including members 34 and 33, thus providing for high heat control of resistance 97. Obviously the bridging contactor may then be moved in the same direction to off position, or it may be moved in the opposite direction to any of its other positions. As aforestated the finger lugs 17 and 18 upon actuating disk 16 cooperate with the elements upon the surface of section 10 to indicate both visually and to the touch the position of the bridging contactor and the condition of the respective circuits subject to control thereby.

The switch mechanism illustrated in Fig. 4 is substantially like that aforedescribed, with the addition of an auxiliary spring contact 68 which is mechanically and electrically connected to member 36, as by means of the eyelet 102,—a recess 103 (see Fig. 5) being provided in section 10 to accommodate the flanged inner end of said eyelet. Contact 68 is adapted for engagement by either of the auxiliary contact arms 66 or 67 formed integrally with the bridging contactor. In this form of the invention I also substitute for the members 34 and 35 aforementioned a one-piece double contact member 104 having a single binding screw 39.

Thus assuming clockwise movement of the bridging contactor from an off position wherein arms 60 and 61 engage the notches 55 and 56, respectively, to its next operative position, circuit may be traced from line $L^1$ through bus member 90 and a resistance element 105 of relatively low heating value, thence to member 36 and arms 61, 60 of the contactor to member 33 and line $L^2$. Upon movement of the contactor in the same direction to its next operative position, a circuit will be completed, which may be traced from line $L^1$ through bus member 90 and a resistance element 106 of medium heating value, thence to member 104 and arms 61, 60 of the contactor to member 33 and line $L^2$. Upon movement of the contactor in the same direction to its next operative position the circuit last described is maintained, and an additional circuit is provided, which may be traced from resistance element 105 to member 36 and auxiliary spring contact 68 to auxiliary contact arm 66 of the bridging contactor, and through the latter and member 33 to line $L^2$,—thus connecting the resistance elements 105 and 106 in circuit in parallel relation to each other to provide a heating effect of high value. As indicated in Fig. 4 and in the other figures, like or identical circuit conditions are provided upon movement of the actuating disk 16 (with consequent movement of the bridging contactor) in either direction through an angle of 180 degrees.

By the arrangement illustrated I have thus provided for snap movement of the contactor in either direction from any given position thereof. This feature is important since it provides for movement of the contactor from off position directly to a position providing low or high heat.

The switch is easily operated by merely grasping the casing in one hand and effecting rotation of the actuating disk in either direction to the desired position by engagement of the thumb of that hand with either of the lugs 17 or 18. As best illustrated in Fig. 9 the bosses 20, 21 and 22 extend a considerable distance above the surface 12 of casing section 10 to readily indicate to the touch the circuit controlling position of the switch contactor.

What I claim as new and desire to secure by Letters Patent is:

1. In an electric feed-through snap switch, in combination, a two-part longtudinally divided insulating casing, switch mechanism including a plurality of cooperating stationary and movable contact elements mounted on the inner face of one of the casing parts, a rotary actuating element mounted on the outer face of said last-mentioned casing part, spring means providing a resilient lost-motion driving connection between said actuating element and a movable contact element of the switch, and additional means comprising a compression spring interposed between a part of said actuating element and said movable contact element to maintain the same in assembled relation to said casing part, said casing part and said actuating element having cooperating cam surfaces adapted to increase the degree of compression of said last-mentioned spring upon a given degree of movement of said actuating element in either direction selectively.

2. In a rotary snap switch of the feed-through type for multiple circuit control, in combination, a longitudinally divided two-part insulating casing having a pair of substantially flat outer faces located in planes parallel to the plane of division thereof, one of the casing sections having a cylindrical recess formed in the outer face thereof, an actuating element comprising an insulating disk adapted to seat within said recess in substantially flush relation with said last-mentioned face, said disk having a raised portion formed integrally therewith and adapted to provide a handle therefor, said casing section having an opening and said disk having a spindle portion extending through said opening, a plurality of stationary contacts secured to the inner face of said casing section and arranged around said opening, a contactor rotatably and slidably mounted upon said spindle and having diametrically opposed arms movable jointly in either direction into and out of bridging relation to certain of said contacts, the inner face of said casing section and said stationary contacts being formed to resist movement of said contactor from each operative position of the latter, means providing a resilient lost-motion driving connection between said spindle and said contactor upon rotation of the former in either direction selectively, and spring means for yieldably retaining all of the movable switch parts in assembled relation to said casing section.

3. In an electric snap switch, in combination, a molded insulating base having a substantially circular opening, a plurality of one-piece combined contact and terminal members secured to one face of said base and having the contact portions thereof arranged in spaced relation about said opening, said base having a cylindrical recess formed in the opposite face thereof, an actuating element located on the last-mentioned face of said base and rotatable in opposite directions selectively, said element having a portion adapted to bear within said recess, a spindle rotatable with said actuating element and extending through said opening, a one-piece punched and stamped sheet metal contactor rotatably and slidably mounted on said spindle, said contactor having a pair of diametrically opposed arms the contact portions of which are located in a given plane and a second pair of diametrically opposed arms positioned at an angle to said first-mentioned arms and having contact portions located in a plane offset upwardly from said first-mentioned plane, spring means providing a lost-motion driving connection between said spindle and said contactor, additional spring means for yieldably retaining said actuating element and said contactor in assembled relation to said base, and an auxiliary spring arm secured to one of said stationary contact and terminal members and having a contact portion located in the plane of said last-mentioned pair of arms on the contactor.

4. A snap switch contactor for multiple circuit control comprising a one-piece punched and stamped sheet metal member having a centrally located bearing opening, a diametrically opposed pair of arms having contact portions thereof located in a given plane, and a second diametrically opposed pair of arms having contact portions extending outwardly beyond said first-mentioned contact portions, said last-mentioned arms being arranged at an angle to said first-mentioned arms and having the contact portions thereof located in a plane offset upwardly from said first-mentioned plane.

5. In a rotary snap switch, in combination, a molded insulating base having a cylindrical recess formed in one face thereof and a circular bearing opening concentric with said recess, a molded insulating disk adapted to seat within said recess and having an integral extension adapted to bear within said opening, a spindle projecting from said extension beyond the other face of said base, stationary contacts arranged in spaced relation to each other around said opening upon the last mentioned face of said base, a movable bridging contactor rotatably and slidably mounted upon said spindle, said stationary contacts and said contactor having cooperative surfaces requiring sliding movement of said contactor upon said spindle to effect disengagement of said contactor from the respective contacts, means comprising a compression spring interposed between the free end of said spindle and said contactor for biasing the latter toward said base and for retaining said movable switch parts in assembled relation, means for effecting rotation of said spindle in opposite directions selectively relatively to said contactor, and a torsion spring in which energy is stored by such relative movement of said spindle, said base and said disk having cooperative cam surfaces adapted to increase the degree of compression of said first-mentioned spring during said energy storing movement whereby snap movement of said contactor in one direction or the other is insured upon a corresponding movement of said spindle.

6. In an electric snap switch, in combination, a molded insulating base, a spindle rotatable in opposite directions selectively relatively to said base, a plurality of combined contact and terminal members secured to said base, the contact portions of said members having edge notches of substantially U-shape, a movable bridging contactor having bosses formed thereon for cooperative engagement with the walls of said notches, a compression spring interposed between one end of said spindle and said contactor for biasing the latter toward said notches respectively, a coiled torsion spring interposed between said spindle and said contactor and tending to effect a predetermined degree of movement of said contactor in one direction or the other upon corresponding movement of said spindle, and cam means associated with said spindle and said base to effect endwise movement of the former for temporarily increasing the degree of compression of said first-mentioned spring whereby a given amount of energy is stored in said torsion spring.

7. In an electric snap switch, in combination, a molded insulating base, a spindle rotatable in opposite directions selectively relatively to said base, a plurality of combined contact and terminal members secured to said base, the contact portions of said members having edge notches of substantially U-shape, a movable bridging contactor having bosses formed thereon for cooperative engagement with the walls of said notches, a compression spring interposed between one end of said spindle and said contactor for biasing the latter toward said notches respectively, a coiled torsion spring interposed between said spindle and said contactor and tending to effect a predetermined degree of movement of said contactor in one direction or the other upon corresponding movement of said spindle, and associated cam means to effect endwise movement of said spindle to temporarily increase the degree of compression of said first-mentioned spring whereby a given amount of energy is stored in said torsion spring, said cam means thereafter acting to release said spindle to permit snap movement of said contactor under the bias of said torsion spring.

8. A feed-through snap switch for multiple circuit control, comprising a longitudinally divided two-part insulating casing having flat outer surfaces parallel to the plane of division thereof, one of said surfaces having a cylindrical recess formed therein, switch mechanism enclosed within said casing, said mechanism comprising a multiplicity of stationary contacts and a contactor rotatable with a snap action in either direction from any given position thereof to make and/or break the circuit or circuits controlled thereby, and manually operable actuating means for said contactor, said means comprising a disk adapted to bear within said recess in a relation substantially flush with said surface, said disk having upstanding finger lugs or projections formed integrally therewith.

9. In an electric switch, in combination, a molded insulating base member having a bearing opening formed therein, a rotatable spindle member having a portion thereof located within said bearing opening and a portion extending beyond said base member at right angles to one face of the latter, a plurality of one-piece combined contact and terminal members secured to said face of the base, said last-mentioned members comprising flat punched sheet metal plates having U-shaped notches forming contact portions at the inner edges thereof, certain of said members having a multiplicity of said notches formed therein, said base having bosses formed integrally with said face thereof, certain of said bosses being located between the respective contact and terminal members and other of said bosses being arranged to substantially fill certain of said notches, a bridging contactor rotatably and slidably mounted upon said spindle member, and means including said spindle member for effecting snap movements of said contactor in either direction selectively.

10. In combination, a combined stationary contact and terminal member for electric snap switches, said member comprising a flat punched sheet metal plate having an arcuate inner edge with a multiplicity of substantially U-shaped notches formed therein, the walls of certain of said notches being adapted to form contact portions, and an insulating base member to which said contact and terminal member is rigidly secured, said base member having bosses formed integrally therewith and adapted to substantially fill certain of said notches flush with the exposed surface of said contact and terminal member.

11. In a feed-through switch device, an insulating casing, a switch mechanism enclosed therein, current carrying members having wire terminal portions and contact surfaces, means associated with said members for holding the latter to said casing, said means including elements passing through said casing, the ends of said elements being deformed to provide shoulders engaging said casing, and a manually actuable switch operating member having a disk-shaped insulating portion covering said deformed ends and insulating them from accidental contact with a person's hand.

12. A feed-through snap switch for multiple circuit control, comprising a longitudinally divided two-part insulating casing having outer flat faces parallel to the plane of division thereof, rotary snap switch mechanism enclosed within said casing, said mechanism including a plurality of combined stationary contact and terminal members positioned in spaced relation to each other upon the inner surface of one of said casing parts, securing elements for said members having portions thereof penetrating said last mentioned casing part and exposed upon the exterior of the latter, a multiple-armed contactor rotatable in opposite directions selectively to effect bridging of the contact portions of said members in sequence, and a disk-like rotatable actuating member for said contactor, said actuating member being positioned upon the outer surface of said last mentioned casing part and in a relation to overlie and conceal the aforementioned exposed portions of said securing elements.

13. A feed-through snap switch for multiple circuit control, comprising a longitudinally divided two-part insulating casing having outer flat faces parallel to the plane of division thereof, rotary snap switch mechanism enclosed within said casing, said mechanism including a plurality of combined stationary contact and terminal members positioned in spaced relation to each other upon the inner surface of one of said casing parts, securing elements for said members having portions thereof penetrating said last mentioned casing part and exposed upon the exterior of the latter, a multiple-armed contactor rotatable in opposite directions selectively from any one of a number of off positions to effect bridging of the contact portions of said members in predetermined sequences respectively, and a disk-like rotatable actuating member for said contactor, said actuating member being positioned upon the outer surface of said last mentioned casing part and in a relation to overlie and conceal the aforementioned exposed portions of said securing elements.

14. In a feed-through snap switch for multiple circuit control, in combination, a two-part longitudinally divided insulating casing having all of the stationary and movable elements of the switch mechanism located on one section thereof, said switch mechanism comprising a multiplicity of cooperating stationary contacts and a bridging contactor located on one face of said casing section, said contactor being rotatable in opposite directions selectively from any one of a number of off positions to effect bridging of said contacts in different sequences respectively, means penetrating said casing section and exposed on the opposite face of the latter for securing said contacts in position, a disk-shaped rotary actuating element located on the last mentioned face of said casing section and having bearing engagement with the latter, said actuating element comprising insulating material and the same being adapted to overlie said securing means to conceal and insulate the latter, said casing section having an opening and said actuating element having a metal spindle adapted to extend inwardly through said opening, and means including spring means providing a step-by-step lost-motion driving connection between said actuating element and said contactor and also providing for releasable retention of the movable elements of the switch mechanism in assembled relation to said casing section.

15. A feed-through snap switch for multiple circuit control, comprising a longitudinally divided two-part insulating casing having flat outer surfaces parallel to the plane of division thereof, snap switch mechanism enclosed within said casing and secured to one of the parts of the latter, said mechanism comprising a multiplicity of stationary contacts and a contactor rotatable with a snap action in either direction from any given position thereof to make and/or break the circuit or circuits controlled thereby, said contacts having securing means penetrating said last mentioned casing part and exposed in countersunk recesses in the outer face of the latter, and manually operable snap actuating means for said contactor, said actuating means including a metal spindle portion extending inwardly through said casing part and a disk-shaped insulating portion adapted to overlie said recesses, said insulating portion having bearing engagement with said casing part.

GEORGE J. MEUER.